(12) United States Patent
Govindaraju et al.

(10) Patent No.: US 11,755,264 B2
(45) Date of Patent: Sep. 12, 2023

(54) SELECTING A PRINTER BASED ON PROXIMITY

(71) Applicant: ZEBRA TECHNOLOGIES CORPORATION, Lincolnshire, IL (US)

(72) Inventors: Vinod Govindaraju, Cumberland, RI (US); Brian C. Stormont, Uxbridge, MA (US); David A. Langevin, Warwich, RI (US); Gerard R. Corriveau, Blackstone, MA (US)

(73) Assignee: Zebra Technologies Corporation, Lincolnshire, IL (US)

( * ) Notice: Subject to any disclaimer, the term of this patent is extended or adjusted under 35 U.S.C. 154(b) by 14 days.

(21) Appl. No.: 17/402,134

(22) Filed: Aug. 13, 2021

(65) Prior Publication Data

US 2023/0052457 A1    Feb. 16, 2023

(51) Int. Cl.
*G06F 3/12* (2006.01)

(52) U.S. Cl.
CPC .......... *G06F 3/1226* (2013.01); *G06F 3/1207* (2013.01); *G06F 3/1231* (2013.01); *G06F 3/1259* (2013.01); *G06F 3/1292* (2013.01)

(58) Field of Classification Search
None
See application file for complete search history.

(56) References Cited

U.S. PATENT DOCUMENTS

| | | | | |
|---|---|---|---|---|
| 6,026,258 | A | * | 2/2000 | Fresk .............. G03G 15/50 399/87 |
| 2004/0021893 | A1 | | 2/2004 | Stevens et al. |
| 2013/0201518 | A1 | * | 8/2013 | Pan .................. G06F 3/126 358/1.15 |
| 2014/0211254 | A1 | | 7/2014 | Takeuchi et al. |
| 2014/0320921 | A1 | | 10/2014 | Oshima et al. |
| 2017/0262243 | A1 | | 9/2017 | Najari et al. |

(Continued)

FOREIGN PATENT DOCUMENTS

EP    3166297 A1 *  5/2017  ......... H04N 1/00106
JP    2020161013 A  * 10/2020

OTHER PUBLICATIONS

International Search Report and Written Opinion for International Application No. PCT/US2022/34135 dated Oct. 12, 2022.

*Primary Examiner* — Fan Zhang (57) ABSTRACT

A system for choosing a printer based on proximity comprising: a beacon to broadcast a transmission having a beacon ID; a printer to: receive the transmission, determine a received signal strength indicator for the transmission, generate a printer location signal including the beacon ID, the received signal strength indicator, and a printer ID associated with the printer, and transmit the printer location signal to a host server; the host server including a processor and a memory, the server configured to: receive the printer location signal from the printer, determine a printer location based on a predetermined location of the beacon, the beacon ID, and the received signal strength indicator, and associate the printer location with a printer zone; a printer proximity application to: receive a print request, the print request including a print data and a target zone, and transmit the print data to the printer in the target zone.

14 Claims, 8 Drawing Sheets

(56) References Cited

U.S. PATENT DOCUMENTS

| | | |
|---|---|---|
| 2018/0317065 A1 | 11/2018 | Narasimhan et al. |
| 2019/0250025 A1 | 8/2019 | Dixon, Jr. et al. |
| 2022/0137902 A1* | 5/2022 | Ogawa ............... G06F 3/1203 358/1.15 |

\* cited by examiner

SELECTING A PRINTER BASED ON PROXIMITY

BACKGROUND

Determining a printer to send a print job can be a confusing task in an environment of changing map layouts and moving printers. When a print job is needed, it is important that the print job is sent to a printer nearby. This can be complicated by changing layouts to a warehouse or by printers on carts or held by worker being constantly on the move.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In warehouse or office space, a need to print a label or form can occur at random times in random locations throughout the work environment. It can be advantageous to be able to print on-demand from printers at various locations (zones) throughout the work environment. This can be difficult, however, as work environments can change often and the use of mobile printers allows for printers to move throughout the work environment and different zones. In other words, when a warehouse changes its layout every few days, and within those layouts, printers are constantly moving, it can be difficult to know which printer is the best choice for a particular print job based on location.

When a new layout is established in a warehouse, a map of the layout is loaded into a host server. The position of walls, conveyor belts, shelves, loading docks, etc. may be located on the map. The map features the location of Bluetooth Low Energy (BLE) beacons, the position of which is noted in the creation of the map. The BLE beacons within the warehouse broadcast transmissions that are receivable by the mobile devices (printers, tablets, mobile computers) in the warehouse.

When a print job is requested in the warehouse, the print job may be needed in a particular area. Examples of this include printing a label for a box that has been packed and is ready for shipping, printing a label for a pallet of goods before it gets loaded onto a truck at a shipping dock, or printing a label for a shelf to identify an item that was just placed upon the shelf. These examples may be located throughout the warehouse and if a worker was required to retrieve all the labels from the same, centrally positioned printer, the worker would not be able to work at peak efficiency. By being able to recognize mobile printers moving throughout the warehouse and identify which mobile printer is located near where a printed label is required, embodiments of the system described below can provide printed media within or near the area where the label is needed.

The BLE beacons within the warehouse have known locations. After the BLE beacon transmissions are received by the mobile printers, it can be determined how close the mobile printer is to a particular BLE beacon. By dividing the map of the warehouse such that each BLE beacon is in its own zone, and determining how close a mobile printer is to nearby BLE beacons, it can be determined which zone the mobile printer is located.

When a print job needs to be printed in a target zone, it is valuable to know what printers are in the requested zone. The printers may be configured to receive a BLE beacon transmission, and then send a transmission to the host server associating the printer, the BLE beacon, and a received strength of the BLE beacon transmission as received at the printer. The BLE beacon transmission is described in further detail below. The host server can then determine the general location of the printer by determining the distance of the printer from the BLE beacon using the reported beacon signal strength, the BLE beacon having a known location. The process for determining the general location of the printer via the BLE beacon transmission is described below. The BLE beacon's location may be associated with a zone of the warehouse such that any printer determined to be close to a BLE beacon can be assumed to be in the same zone of the BLE beacon.

When a print request is generated, it may be generated within the warehouse either by a user device or by a triggering event, triggering events to be described further below. The print request specifies a print job and a a target zone where the print job is to be sent. The print request may then be sent to a printer proximity application, operating within an application server, where the application server is different than the host server. The printer proximity application receives the print request and prompts the host server for a list of printers located in the requested zone. The printer proximity application selects a printer from the list of printers and then sends the print job to the selected printer (using some form of communication such as Wi-Fi). The print job may then be retrieved from the selected printer.

Examples disclosed herein are directed to a system for choosing a printer based on proximity comprising: a beacon to broadcast a transmission having a beacon ID; a printer to: receive the transmission, determine a received signal strength indicator for the transmission, generate a printer location signal including the beacon ID, the received signal strength indicator, and a printer ID associated with the printer, and transmit the printer location signal to a host server; the host server including a processor and a memory, the server configured to: receive the printer location signal from the printer, determine a printer location based on a predetermined location of the beacon, the beacon ID, and the received signal strength indicator, and associate the printer location with a printer zone; a printer proximity application to: receive a print request, the print request including a print data and a target zone, and transmit the print data to the printer in the target zone.

Additional examples disclosed herein are directed to A method of selecting a printer based on proximity, the method comprising: receiving a printer location signal comprising a printer identification, a beacon identification, and a received signal strength indicator for a transmission received at the printer; determining a printer zone via the beacon identification, the received signal strength indicator for the transmission, and a preset area map; receiving a print request having a target zone and print data; determining if the target zone corresponds to the printer zone; and if the target zone is the same as the printer zone, sending the printer the print data to print.

Further examples disclosed herein are directed to an application server comprising: memory; a processor, the processor capable of operating a process comprising: receiving a print request, the print request comprising a print job and a target zone; requesting a list of printers located in the target zone; selecting a printer from the list of printers; and transmitting the print job to the selected printer.

Figure 1:
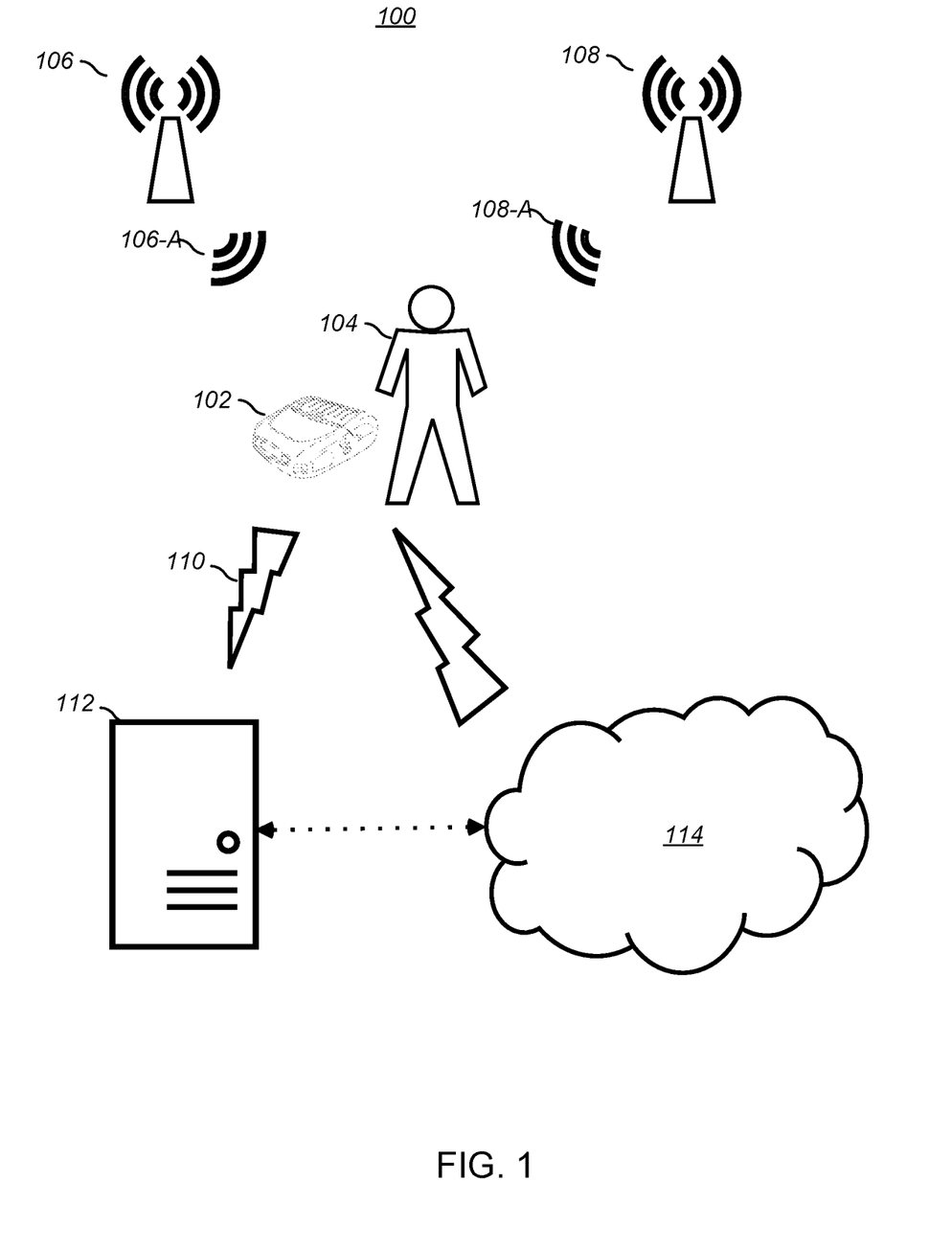
FIG. 1 is an example schematic diagram of a system for determining a media processing device based on location.

FIG. 1 depicts a system 100 including a mobile printer 102, a user 104, and beacons 106 and 108. The mobile printer 102, or printer, may be any type of printer capable of processing media. The printer 102 could include a card printer, an industrial label printer, a mobile label printer, a receipt printer, or any other type of printers that may be used and relocated within an environment. In some embodiments, the environment is a warehouse.

With regards to the user 104, the user 104 may be an employee within the warehouse environment who carries the printer 102 as part of their day-to-day job. The user 104, as depicted in FIG. 1 may also use a cart within the warehouse to transport the printer 102 around the warehouse, where a worker may push the cart to a common location and be able to leave the cart and comeback to it after a short period of time. The printer 102 may also be mounted to a stationary support structure such that the printer 102 within the warehouse at a fixed location with the user 104 working in the vicinity of the printer 102.

With regards to the beacons 106 and 108, in the illustrated example, the beacons 106/108 are such that are used in locationing systems by broadcasting a transmission 106A/108A respectively. The beacons 106/108 can be any type of beacon that transmit a transmission. In the illustrated example, the beacons are Bluetooth Low Energy (BLE) beacons. In the illustrated embodiment, the transmissions 106A/108A contain a beacon identification (ID). The transmissions broadcast from the beacons may be received by the printer 102 or any other device within range of the beacons, where the device is capable of determining a beacon's transmission Received Signal Strength Indicator (RSSI), which is the strength of the transmission received at the device. The RSSI is a measure of the strength of the transmission when the transmission reaches the printer 102 (or any other respective device), as is known in the art. The RSSI of a received transmission directly correlates to a distance between the beacon 106/108 and the printer 102 receiving the transmission. Thus, if the system determines the RSSI of the received beacon transmission, then the distance between the beacon and the printer 102 can be determined. As the location of the beacons is known within the map, if the distance between the beacon and the printer is known, then a general location of the printer can be determined. When a new map configuration is established, the beacon is fixed in the warehouse at a beacon location and that beacon location is recorded with the host server. The use of the beacon transmissions will be further described below.

In the embodiment depicted in FIG. 1, the printer 102 is depicted as being closer in position to beacon 106 than to beacon 108, which means that the transmission 106A will have a greater RSSI when reaching the printer 102 than transmission 108A. As will be further described below, the printer 102 receiving a stronger transmission from beacon 106 may lead to the printer 102 associating itself with the zone of the beacon 106.

Once the printer 102 receives the BLE beacon transmission 106A, the printer 102 reads the beacon ID and determines the transmission's RSSI, and sends a printer location signal 110 to a host server 112. In the illustrated embodiment, the printer location signal 110 contains the beacon ID carried by transmission 106A, the transmission's RSSI as received at the printer 102, and a printer identification (ID). The printer ID is a string of numbers or characters that are associated to the printer 102 which may also include the IP address of the printer. The printer location signal 110 may be sent by any means known in the art including Wi-Fi, BLE, or via wired connection.

As illustrated, in various embodiments, the host server 112 manages the locations of printers within the environment. The host server 112 receives the printer location signals and determines the general location of the printer 102 given the beacon ID (the location of which is known) and the RSSI of the transmission at the printer. As the beacon 106 is correlated to a zone within the environment, the zone is also applied to the printer 102, which will be described further below.

In the illustrated embodiment, an application server 114 is in communication with the host server 112. The host server 112 and the application server 114 may be on the same machine or may be on different machines. The communication between the host server 112 and the application server 114 may happen using REST methods as known in the art. The application server 114 can make requests to the host server 112 for information by making REST calls which are managed through HTTP/HTTPS methods. If the host server and the application server are on different machines, they may communicate via Wi-Fi or ethernet, which may depend upon the configurations of the host server and the application server, the key aspect being that the application server needs to know an address for the host server and must be reachable to send REST requests. The application server 114 is configured to receive a print request having a target zone for a print job. The application server 114 then contacts the host server 112 and requests a list of printers having printer locations within the target zone. If no printers are available in the target zone, the application server can request for printers having locations within an adjacent zone. Once the application server 114 receives the printer list, the application server chooses a printer on the list and sends the print job to the selected printer for printing. The application server knows the selected printer is in the target zone as the selected printer sent a printer location signal 110 to the host server 112, updating the printer's location within the system, allowing the host server 112 to associate the printer 102 with the target zone. This process is described further below.

Figure 2A:
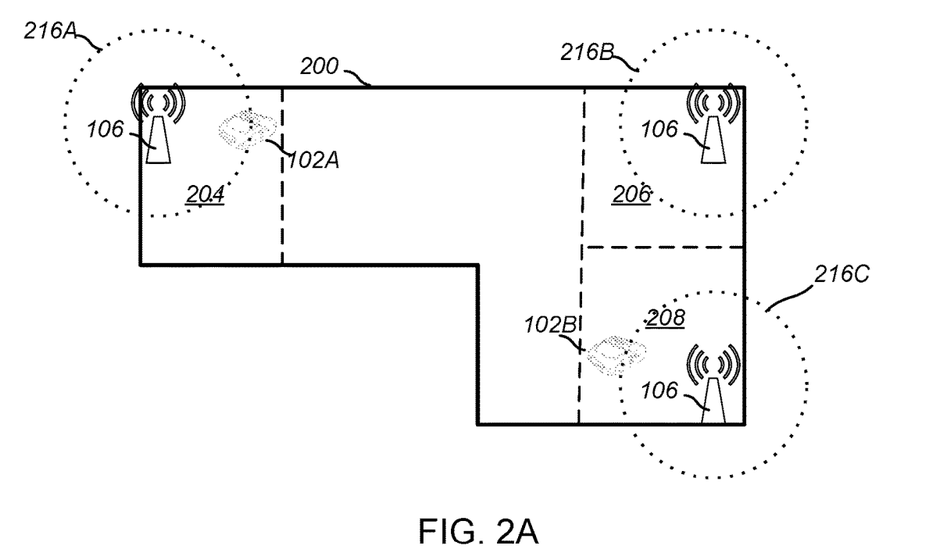
FIGS. 2A-2B are maps of example environments showing the systems of FIG. 1.
Figure 2B:
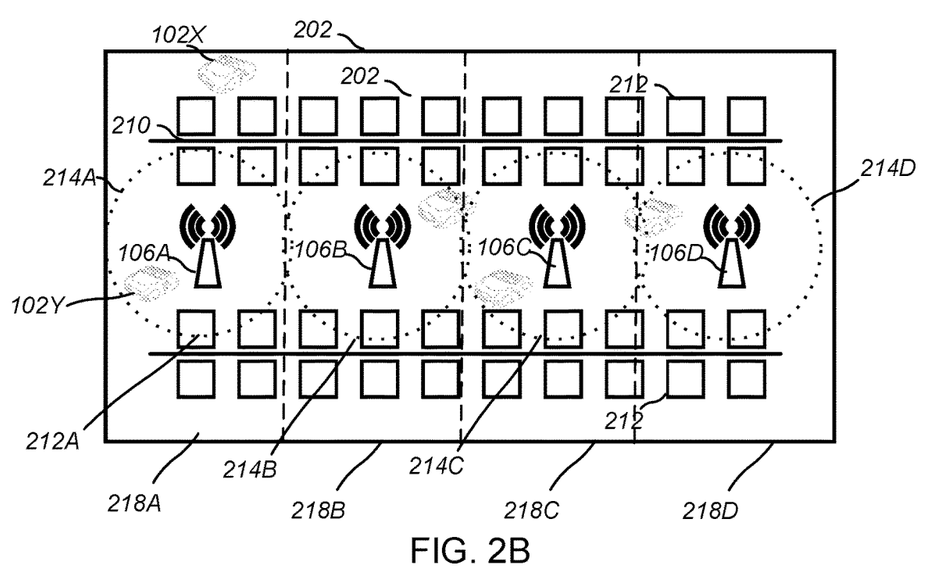

FIGS. 2A-2B depict example map layouts of the warehouse environment. FIG. 2A depicts a possible map 200 having three zones for possible printing (204, 206, 208). In the illustrated embodiment, each zone of map 200 features its own BLE beacon 106.

As is depicted in FIG. 2A, each beacon 106 reaches an area 216A-216C, respectively, where the beacon's transmission's RSSI from the respective beacon 106 would be strong enough for a printer 102 to recognize. However it is understood that as a BLE beacon, the beacons broadcast from each of the beacons 106 would propagate throughout the entire map, not just the area 216. In the illustrated embodiment of FIG. 2A, if the printer 102 enters in or near the area 216 of a respective beacon 106, the printer 102 may receive the respective beacon transmission from the beacon 106. The printer 102 then sends a printer location signal to the host server 112 for location, the printer location signal including data from the beacon transmission. For example, if the printer 102 in FIG. 2A were to receive a transmission from beacon 106 within zone 216A, printer 102 would send the printer location signal to the host server 112, the printer location signal including the beacon ID received from the transmission, the RS SI of the transmission as received by the printer 102, the printer IP address, and the printer ID. The host server 112 can determine the zone of the printer based on the (known) location of the beacon 106, and the RSSI of the transmission at the location of the printer. When a printer location signal is received by the host server 112, the host server 112 may use the printer location signal to update the zone of the printer 102 as saved within the host server 112. Therefore, if a print request comprising a print job and a target zone was triggered for zone 204 in FIG. 2A, the host server 112 can recall that that printer 102A is within the zone 204 as the printer 102A sent the printer location signal comprising the data from the transmission as received from beacon 106. In some embodiments, there may be a plurality of printers within the same zone of the environment, each of the plurality of printers sending printer location signals after receiving the transmission from beacon 106. Each of the plurality of printers may be a difference distance from the beacon 106 and would therefore include a different RSSI value in their respective printer location signal. The printer ID and printer IP address from each printer, the RSSI, and the determined zone for each printer may be recorded by the host server 112.

As is depicted in FIG. 2B, each beacon's transmission 106A-106D reaches an area 214A-214D, respectively, where the transmission RSSI from the respective beacons 106A-106D are strong enough for a printer 102 to recognize, however it is understood that as a BLE beacon, the transmissions broadcast from each of the beacons 106A-106D would propagate throughout the entire map, not just the area 214A-214D. It is understood that in an open environment, a printer 102 may receive transmissions from a plurality of beacons. As the beacons would be at different distances from the printer 102, the transmissions as received at the printer 102 would have different RSSI values. The printer 102 may send a printer location signal for each transmission received at the printer 102. The host server 112, upon receiving the printer location signals from the printer 102, can determine the closest beacon to the printer 102 as the beacon being associated with the transmission having the greatest RSSI. The host server 112 then records the printer's zone as being the zone associated with the closest beacon to the printer. With regards to other transmissions from beacons further away, which are received at the printer 102 and sent to the host server as printer location signals, the host server 112 may ignore the printer locations signals once they are recognized as coming from a further distance away.

As the printer 102 moves around the environment, the printer 102 periodically receives transmissions from beacons. The new transmissions received will cause the printer to transmit additional printer location signals to the host server 112. When the host server 112 receives the new printer location signals from the printer 102, the host server 112 may update the printer zone associated with the printer 102 if that printer had moved into a new zone since the printers last transmitted printer location signal.

In the illustrated embodiment of FIG. 2B, the warehouse 202 features two conveyor belts 210 arranged with bins 212 on each side. As an example, a worker in the warehouse is loading goods from the conveyor belt 210 and into the bin 212A. When the bin 212A is full, a print request is created to print a label to be adhered to the outside of the bin 212A for shipping. The print request may be triggered manually, for example, by a worker loading the bin 212A, or automatically, for example by a sensor on the bin 212A that activates when the bin 212A is full. In the illustrated embodiment of FIG. 2B, the print request may be generated by a worker, sending the print request indicating that a print job is required in zone 218A. In this example, the application server 114 may receive the print job and in response, send an inquiry to the host server 112 for a list of all printers located in zone 218A. The host server 112 scans it's memory and transmits a list to the application server 114 that printers 102X and 102Y are both located in the zone 218A. A printer would then be chosen from the list, either automatically by strongest RSSI to beacon 106A or manually via a prompt sent to a display of a user, where the user selects the printer to be used and the print job would be sent to the selected printer in zone 218A which would inherently be in the vicinity of bin 212A.

Figure 3:
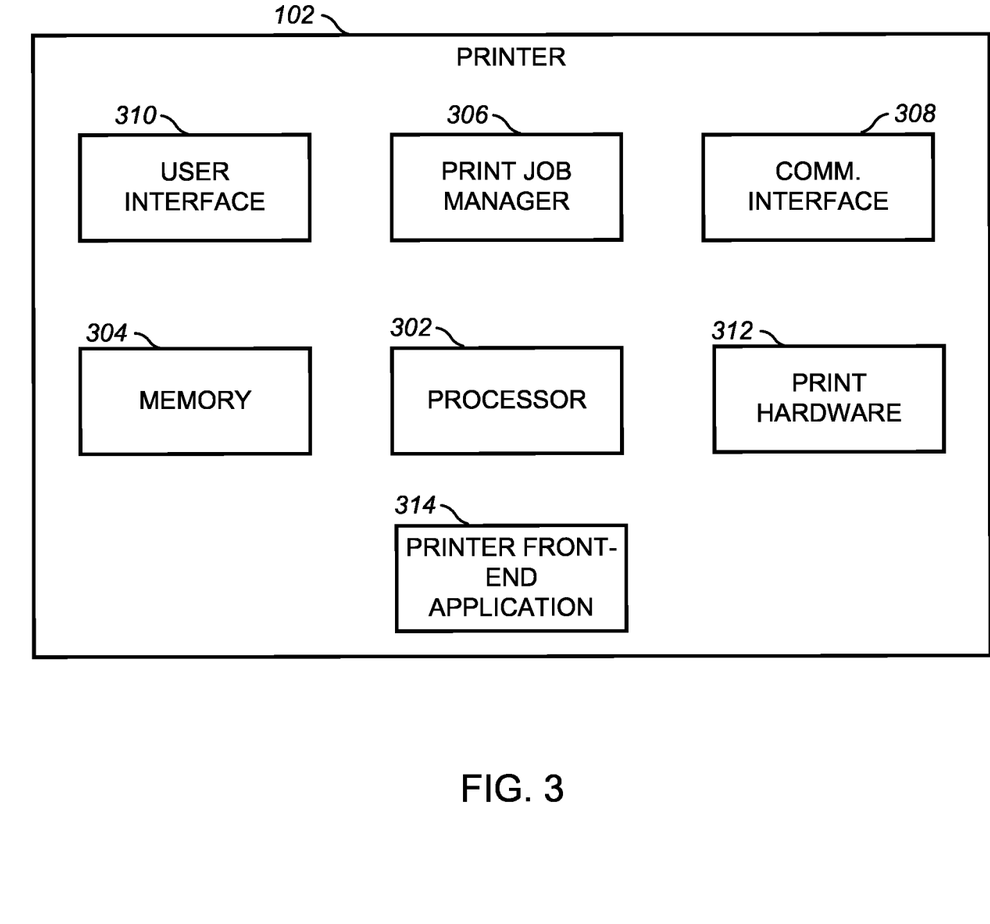
FIG. 3 illustrates a block diagram of an example printer from FIG. 1.

FIG. 3 illustrates an example block diagram of a printer 102 that includes print hardware and printer functionality. Printer 102 is configured to support connections to the host server 112 and the application server 114 as described above via utilization of a processor 302, a memory device 304, a user interface 310, a communication interface 308, a print job manager 306, and print hardware 312.

The processor 302 may be embodied as various means for implementing the various functionalities of example embodiments of the present invention including, for example, a microprocessor, a coprocessor, a controller, a special-purpose integrated circuit such as, for example, an ASIC (application specific integrated circuit), an FPGA (field programmable gate array), or a hardware accelerator, processing circuitry or the like. According to one example embodiment, processor 302 may be representative of a plurality of processors, or one or more multiple core processors, operating in concert. Further, the processor 302 may be comprised of a plurality of transistors, logic gates, a clock (for example, oscillator), other circuitry, and the like to facilitate performance of the functionality described herein. In some example embodiments, the processor 302 is configured to execute instructions stored in the memory device 304 or instructions otherwise accessible to the processor 302. The processor 302 may be configured to operate such that the processor causes the printer 102 to perform various functionalities described herein.

Whether configured as hardware or via instructions stored on a computer-readable storage medium, or by a combination thereof, the processor 302 may be an entity capable of performing operations according to embodiments of the present invention while configured accordingly. Thus, in example embodiments where the processor 302 is embodied as, or is part of, an ASIC, FPGA, or the like, the processor 302 is specifically configured hardware for conducting the operations described herein. Alternatively, in example embodiments where the processor 302 is embodied as an executor of instructions or computer program code stored on a non-transitory computer-readable storage medium, the instructions specifically configure the processor 302 to perform the algorithms and operations described herein. In some example embodiments, the processor 302 is a processor of a specific device (e.g., a printer) configured for employing example embodiments of the present invention by further configuration of the processor 302 via executed instructions for performing the algorithms, methods, and operations described herein.

The memory device 304 may be one or more non-transitory computer-readable storage media that may include volatile and/or non-volatile memory. In some example embodiments, the memory device 304 includes Random Access Memory (RAM) including dynamic and/or static RAM, on-chip or off-chip cache memory, and/or the like. Further, memory device 304 may include non-volatile memory, which may be embedded and/or removable, and may include, for example, read-only memory, flash memory, magnetic storage devices or the like. Memory device 304 may include a cache area for temporary storage of data. In this regard, some or all of memory device 304 may be included within the processor 302. Memory device 304 may be further configured to store data for general purpose or user-defined settings or variables for use in accordance with example embodiments described herein.

Further, the memory device 304, which may be one or more memory devices, may be configured to store information, data, applications, computer-readable program code instructions, and/or the like for enabling the processor 302 and the example printer 102 to carry out various functions in accordance with example embodiments of the present invention described herein. For example, the memory device 304 could be configured to buffer input data for processing by the processor 302. Additionally, or alternatively, the memory device 304 may be configured to store instructions for execution by the processor 302.

The communication interface 308 may be any device or means (for example, circuitry) embodied in hardware, a computer program product, or a combination of hardware and a computer program product that is configured to receive and/or transmit data from/to the host server 112 or the application server 114, and/or any other device or module in communication with the example printer 102. The communications interface may be configured to communicate information via any type of wired or wireless connection, and via any type of communications protocol, such as a communications protocol that supports near field communications. According to various example embodiments, the communication interface 308 may be configured to support the transmission and reception of communications in a variety of networks including, but not limited to Internet Protocol (IP)-based networks (for example, the Internet) or the like. Further, the communications interface 308 may be configured to support device-to-device communications.

Processor 302 may also be configured to facilitate communications via the communications interface 308 by, for example, controlling hardware comprised within the communications interface 308. In this regard, the communication interface 308 may comprise, for example, communications driver circuitry, one or more antennas, a transmitter, a receiver, a transceiver and/or supporting hardware, including, for example, a processor for enabling communications.

The user interface 310 may be in communication with the processor 302 to receive user input via the user interface 310 and/or to present output to a user as, for example, audible, visual, mechanical or other output indications. The user interface 310 may include, for example, a keyboard or keypad, a display (for example, a touch screen display), or other input/output mechanisms. Further, the processor 302 may comprise, or be in communication with, user interface circuitry configured to control at least some functions of one or more elements of the user interface. The processor 302 and/or user interface circuitry may be configured to control one or more functions of one or more elements of the user interface through computer program instructions (for example, software and/or firmware) stored on a memory accessible to the processor 302 (for example, volatile memory, non-volatile memory, and/or the like). In some example embodiments, the user interface circuitry is configured to facilitate user control of at least some functions of the printer 102 through the use of a display and configured to respond to user inputs. The processor 302 may also comprise, or be in communication with, display circuitry configured to display at least a portion of a user interface, the display and the display circuitry configured to facilitate user control of at least some functions of the printer 102. The user interface 310 may be used to display alerts to the user.

The print hardware 312 may include the various hardware devices and components that support printing on a media. In this regard, the print hardware 312 may include rollers, platens, motor operators, printheads, print ribbons, and other hardware configured to support printing on a media. Media may also support machine-readable data, such as a magnetic stripe, RFID tag, NFC tag, or magnetic memory. In this regard, the print hardware may also include hardware configured to support storing data in these fields, or reading and writing data to these devices, such as a magnetic stripe reader, an RFID interrogator, an NFC module, or a memory reading device.

The print job manager 306 may be embodied in hardware (e.g., in the form of an ASIC or FPGA) or as instructions executed by the processor 302 to control the operation of printing. In this regard, the printer 102 may be configured to receive a print job, and under the control of the print job manager 306, the printer 102 may print information or a design on a media. The print job manager 306 may also be configured to manage spooling and buffering of print jobs.

The printer front-end application 314 may be embodied in hardware (e.g., in the form of an ASIC or FPGA) or as instructions executed by the processor 302 to support the operation of an adaptive printer-based application framework. In this regard, the printer 102 may be configured to receive instructions and requests from a server-implemented application, and act upon those instructions or requests via the implementation of the printer front-end application 314.

Figure 4A:
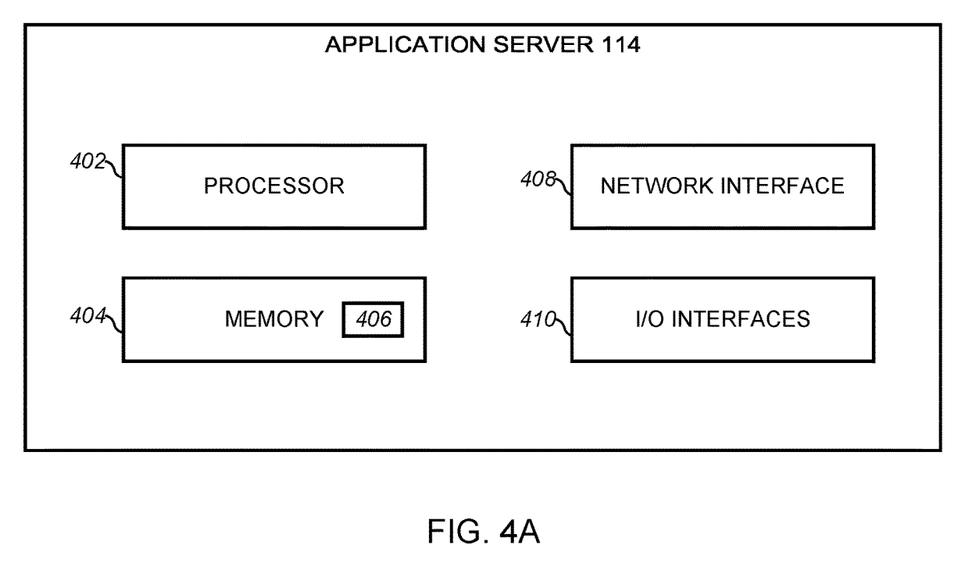
FIG. 4A illustrates a block diagram of an example application server from FIG. 1.
Figure 4B:
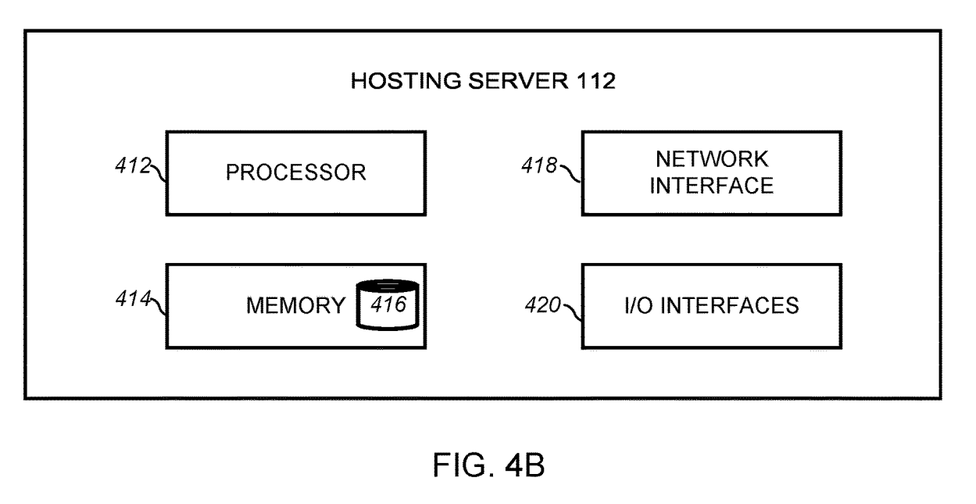
FIG. 4B illustrates a block diagram of an example host server from FIG. 1.

FIGS. 4A-B illustrates an example block diagram of an application server 114 and a host server 112 that includes hardware and functionality.

FIGS. 4A-B is a block diagram representative of an example logic circuit that may be utilized to implement, the example application server 114 and the example host server 112 of FIGS. 1, 6, and/or 8. The example logic circuit of FIGS. 4A-B is an application server 114 and a host server 112, respectively, capable of executing instructions to, for example, implement the example operations represented by the flowcharts of the drawings accompanying this description. As described below, alternative example logic circuits include hardware (e.g., a gate array) specifically configured for performing operations represented by the flowcharts of the drawings accompanying this description.

The example application server 114 and host server 112 of FIGS. 4A-B, respectively, include a processor 402,412 such as, for example, one or more microprocessors, controllers, and/or any suitable type of processor. The example application server 114 and host server 112 of FIGS. 4A-B include memory (e.g., volatile memory, non-volatile memory) 404, 414 accessible by the processor 402,412 (e.g., via a memory controller). The example processor 402,412 interacts with the memory 404,414 to obtain, for example, machine-readable instructions stored in the memory 404,414 corresponding to, for example, the operations represented by the flowcharts of this disclosure. Additionally or alternatively, machine-readable instructions corresponding to the example operations of the flowcharts may be stored on one or more removable media (e.g., a compact disc, a digital versatile disc, removable flash memory, etc.) that may be coupled to the processing platform 402,412 to provide access to the machine-readable instructions stored thereon.

The example application server 114 of FIG. 4A, includes machine readable instructions 406 which is obtained by the processor 402. The example processor 402 operates in accordance with the machine readable instructions 406 for performing operations represented by the flowcharts of the drawings accompanying this description.

The memory 414 of FIG. 4B comprises, without limitation, a database 416 of printers within the system associated with the zone in which the printer is located. The process of determining the zone of a printer will be described below. It should be understood that FIGS. 4A-B is a simplified representation of the server 300 for purposes of explanation and is not intended to limit the scope of the subject matter in any way. In this regard, although FIG. 4B depicts the database 416 as being part of the memory 414 of the host server 112, in practice, the database 416 may be stored at a remote location separate from the memory 414, but accessible by the host server 112. The processor 412 is configured to access the database 416 to identify the location of printer 102 with regard to zones in the environment, as described below.

The example application server 114 and host server 112 of FIGS. 4A-B, respectively, include a network interface 408, 418 to enable communication with other machines via, for example, one or more networks. The example network interfaces 408,418 include any suitable type of communication interface(s) (e.g., wired and/or wireless interfaces) configured to operate in accordance with any suitable protocol(s).

The example application server 114 and host server 112 of FIGS. 4A-B, respectively, include input/output (I/O) interfaces 410,420 to enable receipt of user input and communication of output data to the user.

Figure 5:
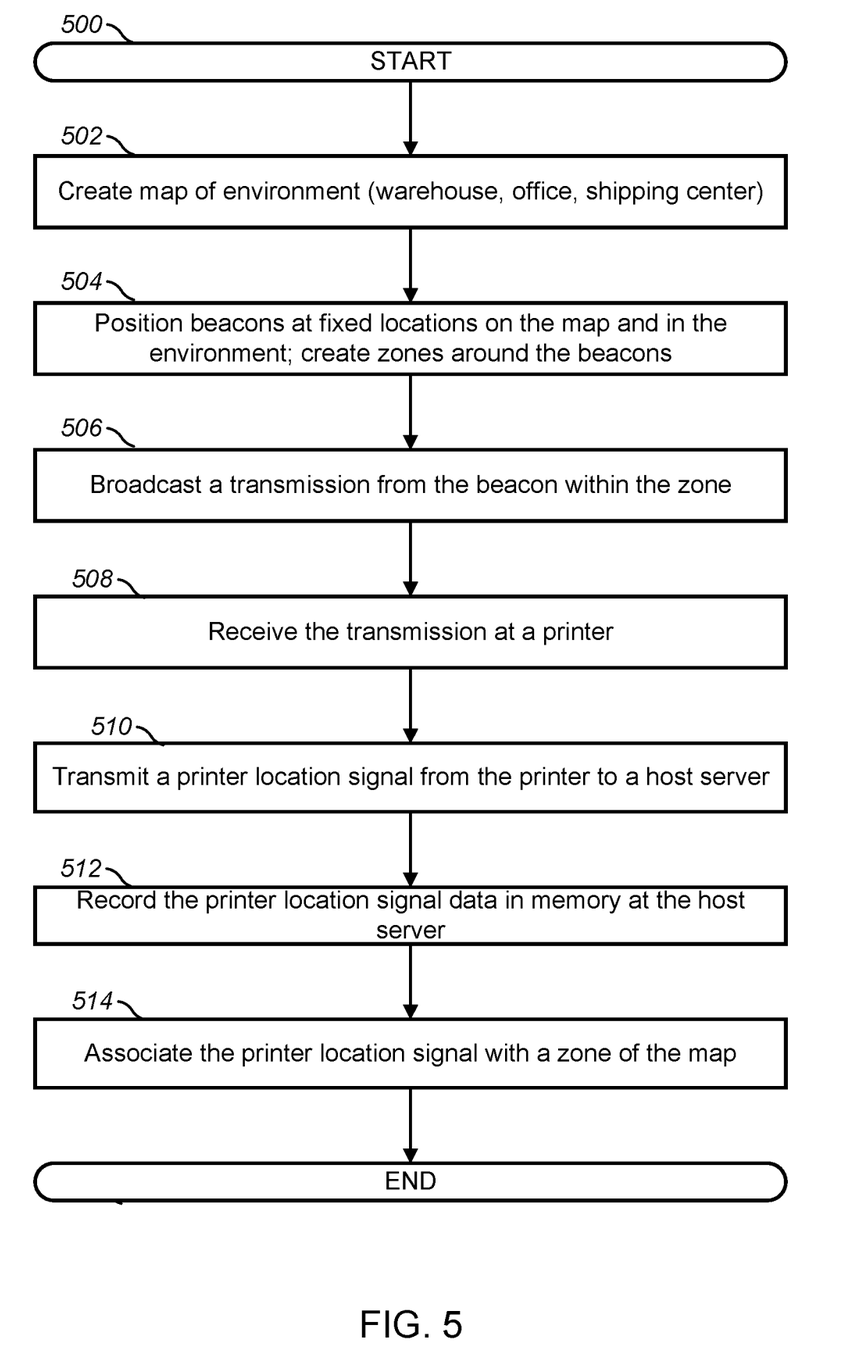
FIG. 5 illustrates an example flow chart of a method for associating a printer with a zone of the map.

FIG. 5 illustrates a method for associating a printer with a zone of the map.

Step 502 in the illustrated embodiment is to create a map of the environment. As described above, for many warehouses or office spaces, it is not uncommon to rearrange the space from time to time. When the environment is rearranged, for example, if a shipment is expected or additional shelves for stock is needed, then printers and such may be moved to a different location. The creating of the map can be done by ways known in the art such as with AR cameras, by robot, or by worker traversing the warehouse and developing a positional heat map. The map may be arranged on a cartesian plane having x- and y-axis. The map will be made to resemble the environment. Please see FIG. 2A-2B for examples.

For step 504, the beacons are positioned at fixed locations on the map and in the environment, and then zones are created in the map around the beacons. The beacon positioning is typically done by workers in the environment who are assigned the task of reconfiguring the environment and establishing new locations for the beacons. The new locations of the beacons are associate with locations of the map as saved with the host server 112. Once the map of the new layout for the environment is made, the locations of beacons 106 may be added to the map. The creating of the zones around the locations of the beacons may be done then by either a worker entering objects into the map or automatically by the host server 112 once all beacons and objects are entered into the map. The beacons 106 will be put at fixed locations throughout the environment. The beacons 106 may be configured to work in battery save, iBeacon, Mpact, SecureCast and Eddystone modes. The position of the beacons 106 in the digital map and in the physical environment are to match through methods known in the art, one of which being the use of the X-Y coordinates on the cartesian plane. Once the locations of the beacons 106 are in the map, zones can be created. The zones can be established on the same X-Y plane as the locations of the beacons 106. The X-Y coordinates may be correlated to real world locations and distances within the environment, and the RSSI of the transmissions may be converted to a distance on the cartesian plane. The zones do not need to have physical boundaries within the physical world, but rather the zones may comprise a logical boundary associated with a portion of the environment. For example, if the environment is a closely assembled warehouse, there may be beacons arranged such that zones may be created directly adjacent to other zones. However, if, for example, the environment is an office space with walls and more predefined physical zones, fewer beacons may be needed. The reason for this is that the zones are intended to give a general location for the printer in the environment. If a printer is in an office type location with walled off offices and such, it would be difficult for the beacons to reach areas pass the walls, therefore if a printer is receiving a transmission from a beacon in an office, it can be reasonably inferred that the printer is located in the same room as the beacon. Please see the map examples in FIGS. 2A-2B for examples.

For step 506, the beacons 106 broadcast a transmission. The type of transmission is dependent upon the type of beacon, for example, a BLE beacon would broadcast BLE signals. The transmissions can be any type of radio signals that can transmit data from one location to another. The transmission includes data identifying the beacon 106 (beacon ID).

For step 508, the transmission is received at the printer 102. In the illustrated embodiment, the transmission is broadcast by the beacon 106 and received by the printer 102. When the printer 102 receives the transmission, the printer may determine the beacon ID as in the transmission. The printer 102 then takes this data and creates its own printer location signal using the beacon ID, the transmission strength as received, and the printer ID, which may be a serial number of the printer 102. It is important to know that the printer may receive many different transmissions from a plurality of different beacons (See FIG. 2B). However, while the printer 102 is receiving transmissions from multiple beacons, by determining the RSSI of the received transmissions, the printer location can be determined, as was described above.

For step 510, the printer 102 transmits a printer location signal from the printer to the host server 112. In the illustrated example, the printer 102 is connected to the host server 112 via Wi-Fi and transfers the printer location signal over Wi-Fi, but it would be known that the signal could also be sent by other known wireless or wired transmission methods. The printer location signal is a signal containing printer identification (ID), the beacon ID, and the RSSI of the transmission as received by the printer 102. The printer location signal may be transmitted to the host server 112 via a REST API.

For step 512, the host server 112 records the printer location signal data in memory at the host server 112. The host server 112 may comprise a searchable database that can be used to store the location information of a printer 102. The host server 112 may save together the printer ID, the printer IP, the beacon ID, and the RSSI of the signal strength as received at the printer. By knowing the location of beacons in the environment, the transmitting beacon's ID and the RSSI of the signal strength of the transmission as received at the printer, the host server 112 will be able to locate where the printer is as it received a transmission from a known beacon at a known strength. The host server 112 will then be able to determine the general location of the printer 102 by converting the RSSI of the received transmission to an estimated distance the printer 102 must be from the beacon 106. Generally, considering RSSI is based on the signal strength of the transmission as received, and as signal strength diminishes over distance, the lower a RSSI of a received transmission is, the greater the distance the transmission traveled before being received.

As an example, if printer A receives a transmission from a first beacon having an RSSI of −30 dBm and receives a transmission from a second beacon having an RSSI of −75 dBm, it can be determined that printer A is nearer to the first beacon than the second beacon. And as printer A is nearest to the first beacon than (in this example) any other beacon in the environment, it can be determined that printer A is in the same zone as the first beacon, which will be further described below.

For step 514, the host server 112, using the determined printer location from step 512, can determine the zone of the printer 102, otherwise known as the printer zone. As mentioned above, the warehouse environment map is divided into zones based on the location of the beacons 106. By associating the location of the printer 102 to the beacon 106, the zone where the printer 102 is located can be determined. The host server 112 can then associate the zone of the printer 112 with the printer ID, the printer IP address, beacon ID, and RSSI of the received transmission within the memory of the host server 112.

Figure 6:
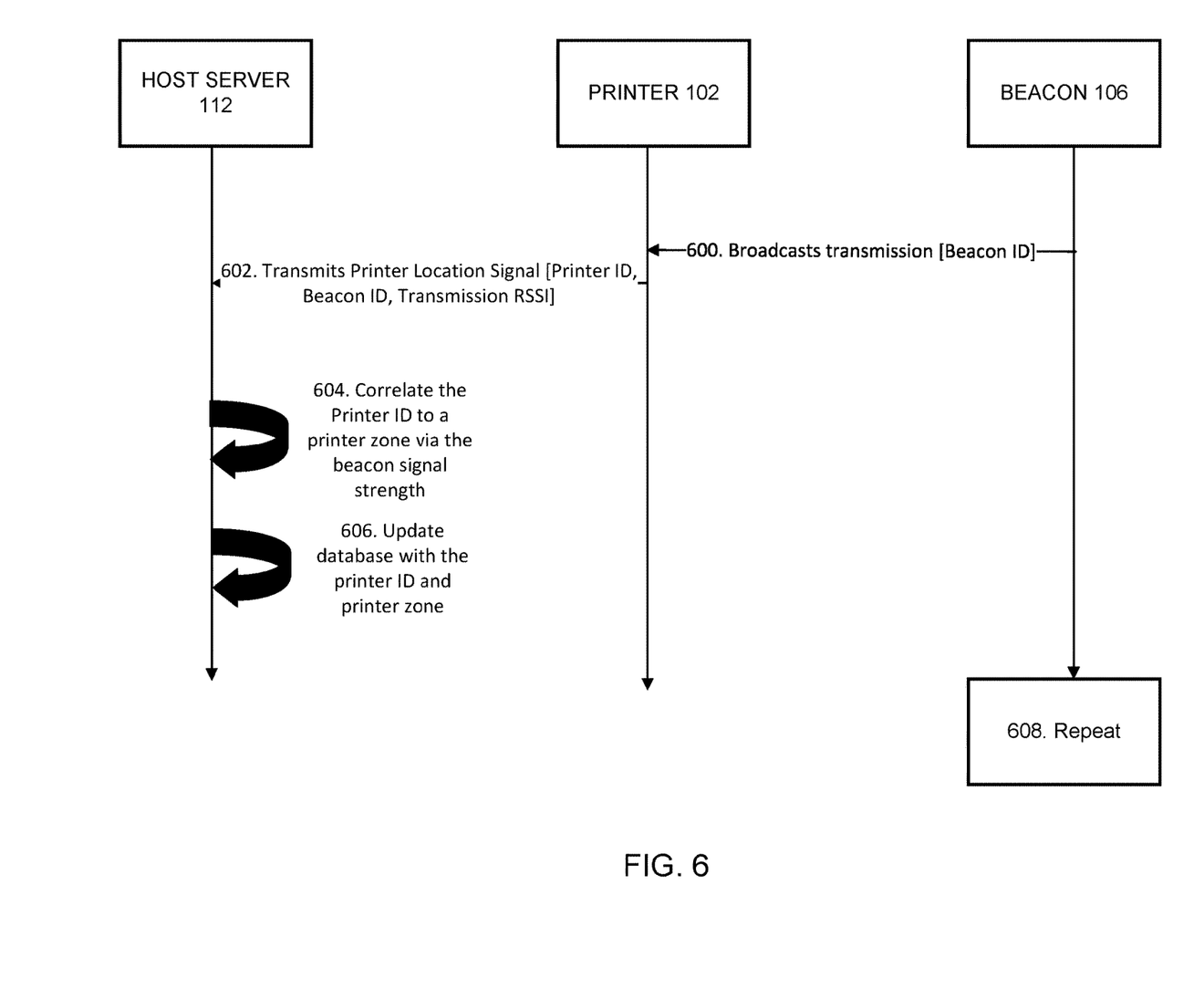
FIG. 6 illustrates an example of a message diagram corresponding to the flow chart of FIG. 5.

FIG. 6 illustrates a message diagram associated to the method of FIG. 5 related to an example for associating a printer with a zone of the map.

FIG. 6 illustrates an example of the system in use for the method of FIG. 5. Step 600 depicts an example transmission between the beacon 106 and the printer 102. The beacon 106 may continuously broadcast throughout the process. As described above, the beacon 106 may broadcast a transmission comprising the beacon identification (ID).

Step 602 depicts an example communication where the printer 102 may generate a printer location signal 110 comprising a printer identification (ID), the printer IP address, a beacon identification, and the RSSI of the transmission received strength. In the illustrated example, the printer location signal is transmitted to the host server 112 via Wi-Fi, however it should be known that any type of communication method can be used including but not limited to a wired connection, BLE, NFC, LTE, 4G/5G; or via a docking system.

Step 604 depicts an example step taken by the host server 112 to correlate the printer ID to a zone via the transmission received by the printer. This process is further described in FIG. 5. It should be known that FIGS. 5 and 6 describe but one method of locating the printer 102 within the environment. The host server 112 determines the printer 102 zone based on the description above.

Step 606 depicts an example to update the database with the printer ID and zone. The database 416 of the host server 112 may maintain a listing of the printers within the system and an up-to-date location for each printer.

Step 608 allows for the process of FIG. 6 to repeat. As it would be evident, as printer 102 may be a mobile printer, printer 102 can move around the environment and may include moving from a first zone to a second zone. As the zone has changed for the printer 102, the change may be reflected in the database 416. The database update allows the system to continuously track printers throughout the environment, which would allow the system to save time during printing as all printer locations will be updated in the system already and will not need to be determined at the time of printing.

It is important to note that although host server 112 and application server 114 are depicted as being separate devices, it would be known to one having ordinary skill in the art that it would be possible for the host server and the application server to be on the same physical device with separated system. In examples where the host server 112 and the application server 114 are separate servers, communication may be via JSON responses, HTTP GET requests, HTTP posts, Wi-Fi commands, or any similar communication method known between two servers.

Figure 7:
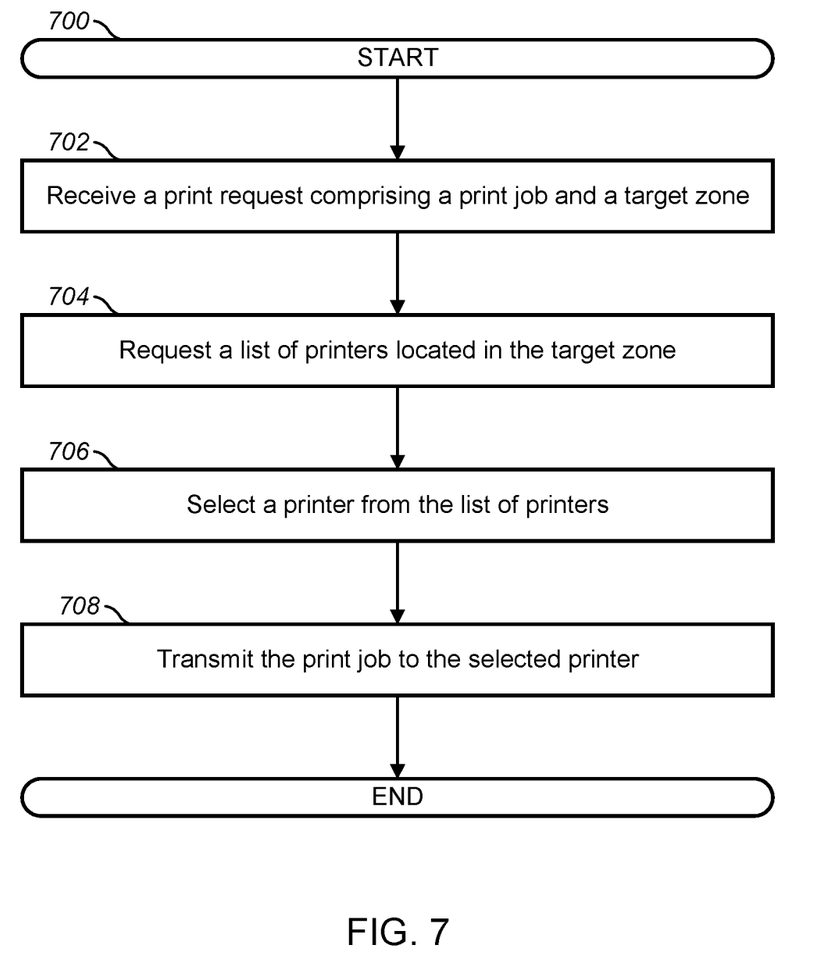
FIG. 7 illustrates an example flow chart of a method for selecting a printer for a print job based upon the location of the printer.

FIG. 7 illustrates a method for selecting a printer for a print job based upon the location of the printer.

Step 702 in the illustrated embodiment is to receive a print request comprising a print job and a print zone. In the illustrated embodiment, the print request is received at the application server 114. The print request may be directly received by the application server 114 or transferred the print request by a waypoint (e.g., a relay, a printer, a radio system, a computing device, a sensor trigger, etc.).

An example of the sensor trigger may be a bin resting on a weight sensor, a worker in the warehouse filling the bin for shipping. The weight sensor in this example may be preset to generate a print request when either a preset weight for the bin is reached or possibly a maximum weight for the bin. The example weight sensor may then send a print request to the application server 114 after the sensor is triggered. Another possible trigger in this example could be a manual trigger from the worker loading the bin. Once the worker determines that the bin is full, the worker can trigger a print request. The print request in this example may be for a label to be printed in the vicinity of the bin. This is but one example of how a sensor may act as a trigger to activate a print request.

As mentioned above, a print request may comprise a print job and a print zone. In the illustrated embodiments, the print job may be a print format and print data that allows a printer to print. In some examples, the print job is generated using Zebra Programming Language ("ZPL"). The print job may include a packing receipt, a label to be applied to a bin after packing, a label to be applied to a pallet of items after being prepared for shipping, or possibly a shelf label.

The print zone of a print request comprises the printer location of where the print job is to be sent. In some embodiments, the print zone may be the same print zone as where the print job is generated. Also, in some embodiments, the print zone may be a different print zone as where the print job is generated.

Step 704 in the illustrated embodiment of FIG. 7 is to request a list of printers located in the print zone. The print zone may be specified in step 702 and is described above. In an example of step 704, the request for the list of printers in the print zone is sent by the application server 114 after receiving the print request. The application server 114 may send the request for the list of printers in the print zone to the host server 112. In some embodiments, the host server 112 searches database 416 within the host server's memory. The database search may then provide a list of printers having the print zone as their most recent printer location update. It should be evident that as the printers may be constantly moving around the warehouse environment, updates to the printer location within the database 416 is needed.

Printers may also be able to be outside of a zone yet within a threshold distance. A threshold distance may be established between the printer and a beacon, wherein the beacon has an established zone. If a printer is not currently within the zone, the system can determine printers near the zone by determining a threshold distance from the beacon to a printer outside of the zone. The threshold distance may be a set distance determinable by the host server 112 wherein a printer within the threshold distance may still be identified for print jobs even if the printer is outside of the target zone.

Step 706 in the illustrated embodiment of FIG. 7 is to select a printer from the list of printers. Once the host server 112 has compiled the list of printers in the print zone, the list may be provided to the application server 114. The application server 114 may then select a printer from the list of printers in the print zone for which to send the print job. The application server 114 may select a printer from the list in a variety of ways. An example embodiment may include providing the list to a user of the system via a user interface or display. The display in this example may be a mobile computer, a terminal, a work station, a vehicle tablet, or another similar method of allowing a user to make a selection from a list provided by a server. Other possible ways to select a printer from the list of printers may be to select the printer with the strongest transmission RSSI, by printing load (identify the printer with the fewest recent print jobs assigned), or by establishing a preferred list of printers to use, however it should be evident that any suitable method of choosing from a list can be used.

Step 708 in the illustrated embodiment of FIG. 7 is to transmit the print job to the selected printer 102. In this embodiment, the selected printer 102 is to be the printer selected from the list of printers in step 706. In the illustrated embodiment, the print job is transmitted wirelessly to the selected printer 102. Once the selected printer receives the print job, the selected printer operates in response to the print job. In some embodiments, the print job causes the printer 102 to print a document of some type. It is important to note however, that in some embodiments, the print job sent to the printer may cause the printer to display information in the printer's user interface. The displayed information may be information for a worker or may be orders for where the printer should go next.

Figure 8:
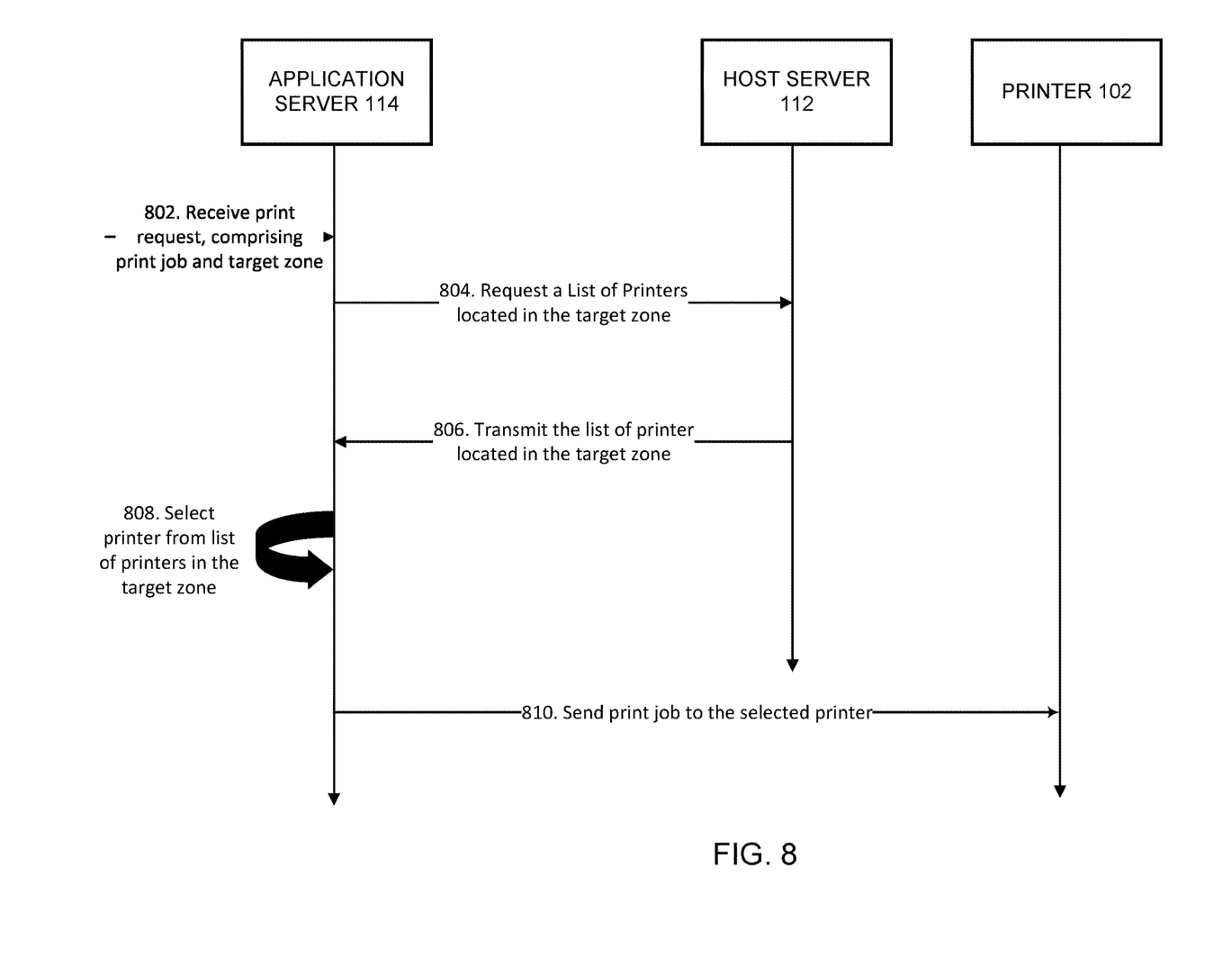
FIG. 8 illustrates an example of a message diagram corresponding to the flow chart of FIG. 7.

FIG. 8 illustrates a message diagram associated to the method of FIG. 7 related to an example for selecting a printer based upon the zone of the printer.

FIG. 8 illustrates an example of the system in use for the method of FIG. 7. Step 802 depicts an example embodiment where the application server 114 receives a print request comprising a print job and print job.

Step 804 depicts a communication from the application server 114 to the host server 112 requesting a list of printers located in the print zone. As has been described in more detail above, the communication is a request where the application server will transmit the zone where the print job is to happen. As the host server 112 maintains the database of the printer locations, the host server 112 is able to parse the data within the database to determine the proper response to the request of the application server.

Step 806 depicts a communication from the host server 112 to the application server 114 transmitting the list of printers located in the print zone. For step 806, and in response to the request of step 804, the host server 112 searches the database for printers featuring the print zone in their most recent printer location updates. That list is then provided to the application server 114. Note that for environments having a plurality of printers moving around, multiple printers may be in a zone at a time. For example, printer A receives transmissions from multiple beacons and sends printer location signals to the host server 112, the host server 112 in turn then determining which of the multiple beacons printer A is closest and updating the location of printer A in the database. At the same time, printer B receives transmissions from multiple beacons as well and sends printer location signals to the host server 112, and the host server 112 in turn then determining which of the multiple beacons printer B is closest. In some scenarios, printer A and printer B both are located closest to the same beacon.

Step 808 depicts a process within the application server 114. After the application server 114 receives the list of printers located in the print zone, the application server 114 selects a printer from the list of printers in the target zone. The printer may be selected in a plurality of ways described in greater detail above. It must be noted that, in the example described above, there may be multiple printers in the same target zone, and in which case the application server 114 would make a selection from available printers in the printer target zone. This selection may be made in a variety of ways, some of which include determining which printer was determined to be closest to a beacon, or the selection may be sent to a user device for the user to make a selection. In this case the user may only be sent the printers in the target zone. It must be noted the difference between the printer zone and the target zone. The environment is broken down into established zones after the installation of the beacons, wherein the established zones will be surrounding the beacons having known locations. The zones surrounding the beacons may be either a target zone, a printer zone, or both. If a print job is wished to be sent to a particular zone in the environment, the zone the print job is being sent to is a target zone. Separately, when tracking the printers within the environment, whatever zone a printer is located in is a printer zone. When the system is instructed a target zone in which to print, the system then compares the instructed target zone against the printer zones of available printers. If a zone of the environment is both the target zone and a printer zone, then the zone is both.

Step 810 depicts a communication between the application server 114 and the printer 102. After the application server 114 selects a printer from the list of printers, the selected printer is sent the print job for processing. In the illustrated embodiment, at the time the print job is sent to the printer 102, the printer 102 is still in the print zone. When the printer 102 receives the print job, the printer 102 then processes the print job per the operation instructions of the print job. In some embodiments, if the printer is no longer in the print zone, the application server 114 may be notified and the print job is sent to a different printer.

Note that while FIG. 8 depicts the application server 114, the host server 112, and the printer 102, with the host server 112 positioned closer to the printer 102 than the application server 114, the positioning of the three elements is arbitrary in that they are positioned for the clarity of FIG. 8. The positioning is not to have meaning into the grouping of elements in the illustrated embodiment.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A system for choosing a printer based on proximity, the system comprising:
   a beacon configured to broadcast a transmission including a beacon ID;
   a printer configured to:
      receive the transmission,
      determine a received signal strength indicator for the transmission, and
      generate and transmit a printer location signal including the beacon ID, the received signal strength indicator, and a printer ID associated with the printer;
   a host server including a processor and a memory, the server configured to:
      receive the printer location signal from the printer,
      determine a printer location based on a predetermined beacon location of the beacon, the beacon ID, and the received signal strength indicator, and
      associate the printer location with a printer zone;

a printer proximity application configured to:
  receive a print request, the print request including a print data and a target zone,
  select the printer IP address by comparing the target zone to the printer zone, and
  transmit the print data to the printer via the printer IP address.

2. The system of claim 1, wherein the print request is generated by a weight sensor.

3. The system of claim 1, comprising a plurality of beacons where the beacon is one of the plurality of beacons and a plurality of printers where the printer is one of the plurality of printers, wherein the beacon ID is unique to the beacon and the printer ID is unique to the printer.

4. The system of claim 1, wherein the printer transmits a second printer location signal to the host server, the second printer location signal comprising a second beacon ID, and a second strength indicator associated with the second beacon ID.

5. The system of claim 1, further comprising a print request zone, wherein the print request zone is an originating zone from which the print request is sent; and the print request zone is different than the target zone.

6. The system of claim 1, wherein the print request originates from the target zone.

7. The system of claim 1, wherein the printer proximity application is further configured to:
  query the host server for a list of printers associated with the printer zone corresponding to the target zone,
  select a printer from the list of printers, and
  transmit the print job to the selected printer.

8. The system of claim 1, wherein if there are no prints associated with the target zone, transmit an alert.

9. The system of claim 1, wherein the printer ID comprises a printer IP address.

10. A method of selecting a printer based on proximity, the method comprising:
  receiving a printer location signal comprising a printer identification, a printer IP address, a beacon identification, and a received signal strength indicator for a transmission received at the printer;
  determining a printer zone via the beacon identification, the received signal strength indicator for the transmission, and a preset area map;
  receiving a print request having a target zone and print data;
  determining if the target zone corresponds to the printer zone; and
  if the target zone is the same as the printer zone, sending the printer the print data to print.

11. The method of claim 10, further comprising sending a plurality of printer identifications having a printer location zone corresponding to the print zone.

12. The method of claim 10, wherein the printer identification is sent to a printing application.

13. The method of claim 10, further comprising receiving a second printer signal comprising the printer identification, a second beacon identification and a second beacon signal RSSI.

14. The method of claim 10, further comprising updating the preset area map based on reconfiguration of an environment.

* * * * *